United States Patent
Chapman

(10) Patent No.: US 9,915,395 B2
(45) Date of Patent: Mar. 13, 2018

(54) CAMERA CRANE TRACTOR

(71) Applicant: Chapman/Leonard Studio Equipment, Inc., North Hollywood, CA (US)

(72) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 253 days.

(21) Appl. No.: 14/981,724

(22) Filed: Dec. 28, 2015

(65) Prior Publication Data

US 2017/0184249 A1   Jun. 29, 2017

(51) Int. Cl.

| B60P 7/08 | (2006.01) |
|---|---|
| F16M 11/42 | (2006.01) |
| B62D 55/06 | (2006.01) |
| B60P 3/073 | (2006.01) |
| B65G 67/04 | (2006.01) |
| B60P 3/06 | (2006.01) |
| B66F 11/04 | (2006.01) |

(52) U.S. Cl.
CPC .............. *F16M 11/42* (2013.01); *B60P 3/062* (2013.01); *B60P 3/073* (2013.01); *B60P 7/08* (2013.01); *B62D 55/06* (2013.01); *B65G 67/04* (2013.01); *B66F 11/048* (2013.01)

(58) Field of Classification Search
CPC .. B60P 3/062; B60P 3/073; B60P 7/08; F16M 11/42; B66F 11/048; B62D 55/06; B62D 55/062; B65G 67/04
USPC ..................... 410/3, 7, 30, 65–67, 56, 57, 80
See application file for complete search history.

(56) References Cited

U.S. PATENT DOCUMENTS

| 2,058,891 A | * | 10/1936 | Kellett | .................... B60P 1/02 410/66 |
| 6,113,326 A | * | 9/2000 | Nicholson | ............... B60P 3/062 410/19 |
| 6,688,819 B1 | * | 2/2004 | Bradel | .................... B60P 1/43 410/11 |
| 2013/0322996 A1 | | 12/2013 | Chapman | |

FOREIGN PATENT DOCUMENTS

| EP | 1721213 A1 | 11/2006 |
| FR | 2693280 A1 | 1/1994 |

OTHER PUBLICATIONS

Extended European Search Report for European Application No. 16205677.4; dated May 5, 2017, 7 pages.

* cited by examiner

*Primary Examiner* — Stephen T Gordon
(74) *Attorney, Agent, or Firm* — Perkins Coie LLP; Kenneth H. Ohriner

(57) ABSTRACT

A camera crane tractor includes first and second spaced apart and parallel wheel decks on a chassis. The tractor has left and right side treads supported on tread rollers on the chassis, and a motor for driving the treads. One or more angled wheel guide strips may be provided on each of the wheel decks, to guide the wheels of a mobile base rolling onto the wheel decks. The wheel guide strips may have an angle complimentary to an angled sidewall of the wheels of the mobile base. Wheels stops are positioned at the ends of the wheel decks to prevent longitudinal movement of the mobile base after it is loaded onto the tractor. Threaded holes may be provided in the chassis between the wheel decks to allow the mobile base to be clamped down onto the tractor.

6 Claims, 5 Drawing Sheets

CAMERA CRANE TRACTOR

BACKGROUND OF THE INVENTION

In the production of motion picture, television and video recordings, the camera must often be supported at a fixed position or moved in a precise trajectory to follow actors or other subjects. The camera movements may require a change in camera position, camera angle, or camera elevation. The camera movement must be performed smoothly, as even small amounts of shock and vibration of the camera can result in unsatisfactory filming, due to shaky or erratic recorded images. Various camera cranes have been used for this purpose.

Typically, a fixed length or telescoping camera crane arm is mounted on a mobile base or other similar vehicle having wheels. The mobile base may be manually pushed and steered by the camera crew, or the mobile base may be self-propelled via one or more electric motors. While these known designs have met with varying degrees of success, existing mobile bases tend to perform poorly on soft surfaces, such as sand or mud. They are also limited to use on relatively flat or only gradually inclined surfaces. Accordingly, engineering challenges remain in providing camera cranes and equipment suitable for use on wide ranges of surfaces, including soft surfaces and steeply inclined surfaces.

Other objects, features and advantages will become apparent from the following detailed description.

SUMMARY OF THE INVENTION

A camera crane tractor includes first and second spaced apart and parallel wheel decks on a chassis. The tractor has left and right side treads supported on tread rollers on the chassis, and a motor for driving the treads. One or more angled wheel guide strips may be provided on each of the wheel decks, to guide the wheels of a mobile base rolling onto the wheel decks. The wheel guide strips may have an angle complimentary to an angled sidewall of the wheels of the mobile base. Wheel stops are positioned at the ends of the wheel decks to prevent longitudinal movement of the mobile base after it is loaded onto the tractor. Threaded holes may be provided in the chassis between the wheel decks to allow the mobile base to be clamped down onto the tractor.

A method for moving a camera crane having a mobile base including a frame and left and right side wheels rotatably attached onto the frame includes moving the mobile base onto a tractor with the left and right side wheels of the mobile base on left and right side wheel decks of the tractor. The wheels of the mobile base may be guided by angled guide strips on the wheel decks, to help keep the mobile base centered on the tractor. A corner or end of the mobile base is lifted or jacked up. A lower arm of a clamp, or a separate spacer, is positioned between the mobile base and the tractor, and the mobile base is lowered back down. A clamp bolt is tightened to clamp the mobile base down onto the tractor. The mobile base is consequently securely attached onto the tractor, optionally with the wheels of the mobile carrying little or no weight of the camera crane.

BRIEF DESCRIPTION OF THE DRAWINGS

In the drawings, the same element number indicates the same element in each of the views.

DETAILED DESCRIPTION OF THE DRAWINGS

Figure 1:
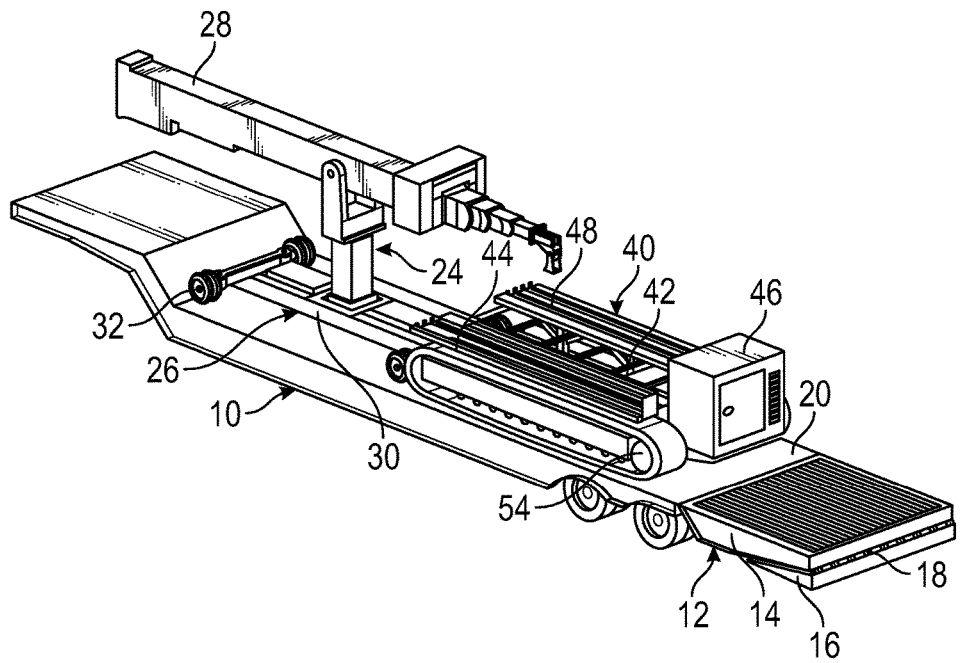
FIG. 1 is a perspective view of a camera crane and a tractor on a flat bed trailer.

Turning now in detail to the drawings, as shown in FIG. 1, a camera crane 24 includes a crane arm 28 supported on a mobile base 26 having wheels 32. The crane arm may be a telescoping crane arm as described in Chapman U.S. Pat. No. 7,128,745, incorporated herein by reference. The mobile base 26 may be a self-propelled electrically powered mobile base as described in Chapman U.S. Pat. No. 8,322,858, incorporated herein by reference. For transport to a filming location, the camera crane 24 may be loaded and secured onto a semi-trailer 10 pulled by a truck-tractor. In the example shown the trailer 10 has a folding ramp 12 having a deck section 14 pivotally attached to the rear deck 20 of the trailer 10, and a ground section 16 attached to the back end of the deck section 14 via a hinge 18.

A tractor 40 may also be carried on the trailer 10. The tractor 40 has wheel decks 48 on the tractor chassis 42. A motor 46 on the chassis 42 drives the treads 44. The treads 44 distribute the weight of the tractor 40 over a large area allowing the tractor to move over soft ground, such as sand or mud, without losing traction. The treads 44 also allow the tractor 40 to move over steeply sloped ground without slipping or skidding. The motor 46 may be an internal combustion engine which drives a hydraulic system which drives tread rollers 54 supporting the treads.

Figure 2:
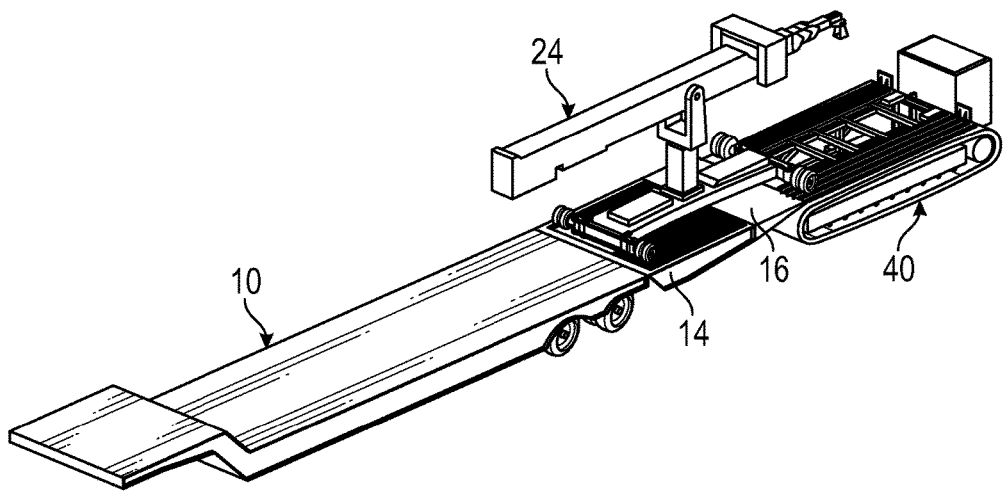
FIG. 2 is a perspective view of the tractor off loaded onto the ground and with the camera crane moving onto the tractor.

In use, the ramp 12 is extended and lowered to the ground, typically via a hydraulic system on the trailer 10. The tractor 40 is then backed down the ramp 12 and onto the ground. As shown in FIG. 2, the ramp 10 is then lifted with rear edge of the ground section 16 of the ramp 10 placed onto the wheel decks 48 on the chassis 42 of the tractor 40. The camera crane 24 is then moved onto tractor 40, typically by via the electric motors in the mobile base 26, or alternatively by manually pushing the mobile base.

Figure 4:
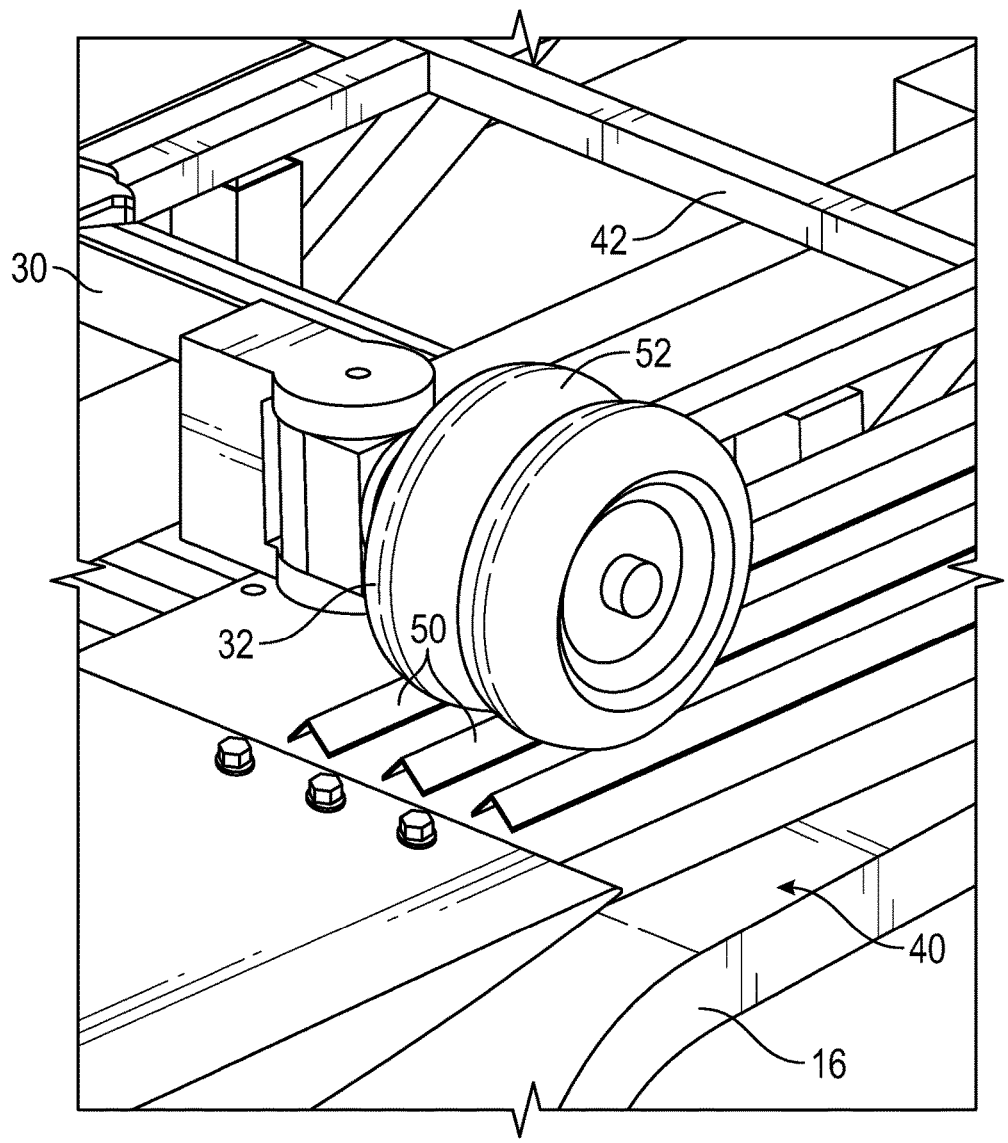
FIG. 4 is an enlarged detail view of the mobile base of the camera crane moving onto a wheel deck of the chassis of the tractor.

Referring to FIG. 4, the wheels 32 of the mobile base 26 may have angled sidewalls 52. Guide strips 50 attached on top of the wheel decks 48 may be provided. The guide strips 50, if used, may be angle sections, such as L or V type of structural steel members, with the angle of the angled sidewalls 52 of the wheels 32 complimentary to the angle of the guide strips 50. In this way the guide strips 50 help to guide the mobile base 26 straight onto the wheel decks 48, keeping the camera crane 24 centered on the tractor 40. The guide strips 50 also help to prevent any lateral movement of the mobile base 26 on the tractor. The steering system of the mobile base 26 may be temporarily disabled electrically so that the wheels 32 are locked into a straight ahead position, or are otherwise prevented from steering off center.

Figure 3:
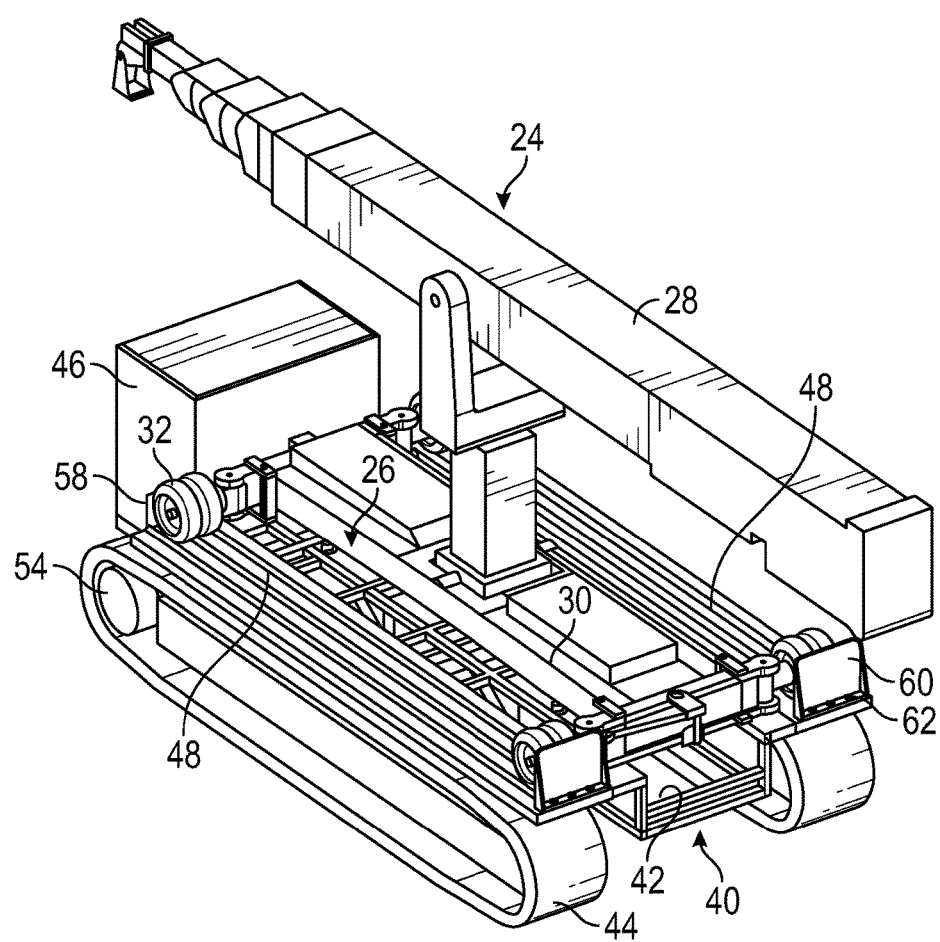
FIG. 3 is a front perspective view of the camera crane loaded onto and secured onto the tractor.

As shown in FIG. 3, the mobile base 26 is moved fully onto the wheel decks 48 of the tractor 40, until the front wheels 32 of the mobile base come to rest against back stops 58 on the tractor chassis 42. Front stops 60 may then be bolted onto the front end of the each wheel deck 48, against the rear wheels 32 of the mobile base 26, so that the camera crane 24 cannot shift forward or rearward on the tractor 40. The front stops 60 may optionally be attached to the wheel decks 48 via hinges. The back stops 58 and the front stops 60 may be provided as plates with gussets for bolting onto the tractor chassis 42. Alternatively, sections of the tractor chassis 42 may act as the back stops 58 with no separate back stop component used.

Figure 6:
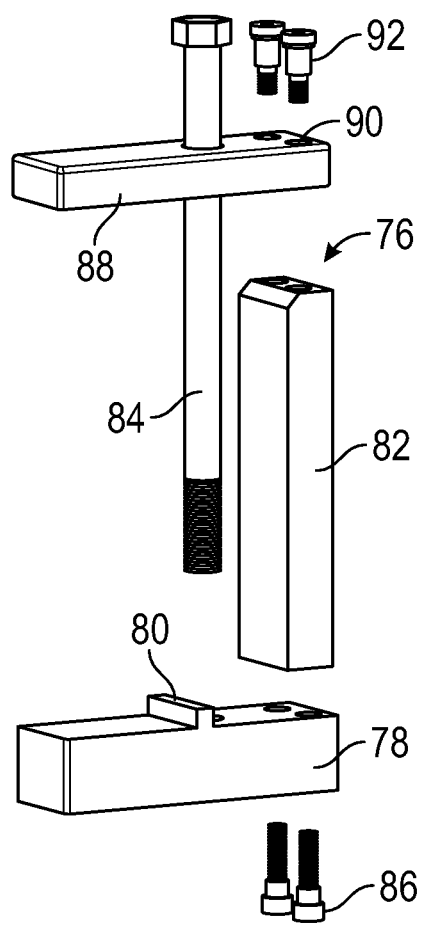
FIG. 6 is an exploded perspective view of the clamp shown in FIG. 5.
Figure 7:
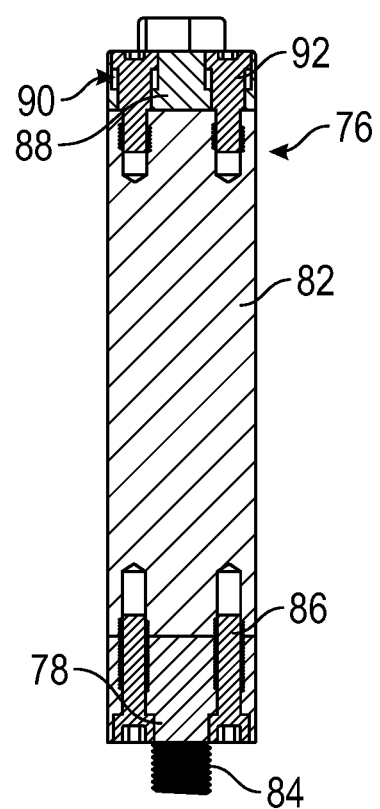
FIG. 7 is a section view of the clamp shown in FIG. 6.

The wheels 32 of the mobile base 26 are typically pneumatic or made of solid rubber or hard plastic. As the camera crane 24 may weigh 12,000 kg, the wheels 32 may compress which contributes to instability. Using a jack 70 and clamps 76, the wheels may be unloaded or unweighted, with the entire weight of the camera crane 24 placed directly on the chassis 42 of the tractor via a rigid metal connection, improving stability. As shown in FIGS. 6 and 7, the clamp 76 has a lower arm 78 optionally including an arm stop 80, with the lower arm 78 attached to a lower end of a post 82 via bolts 86. An upper arm 88 is similarly attached to an upper end of the post 82 via bolts 92 in counter bores 90. A clamp bolt 84 having a threaded lower end extends through the upper arm 88 and the lower arm 78.

Figure 5:
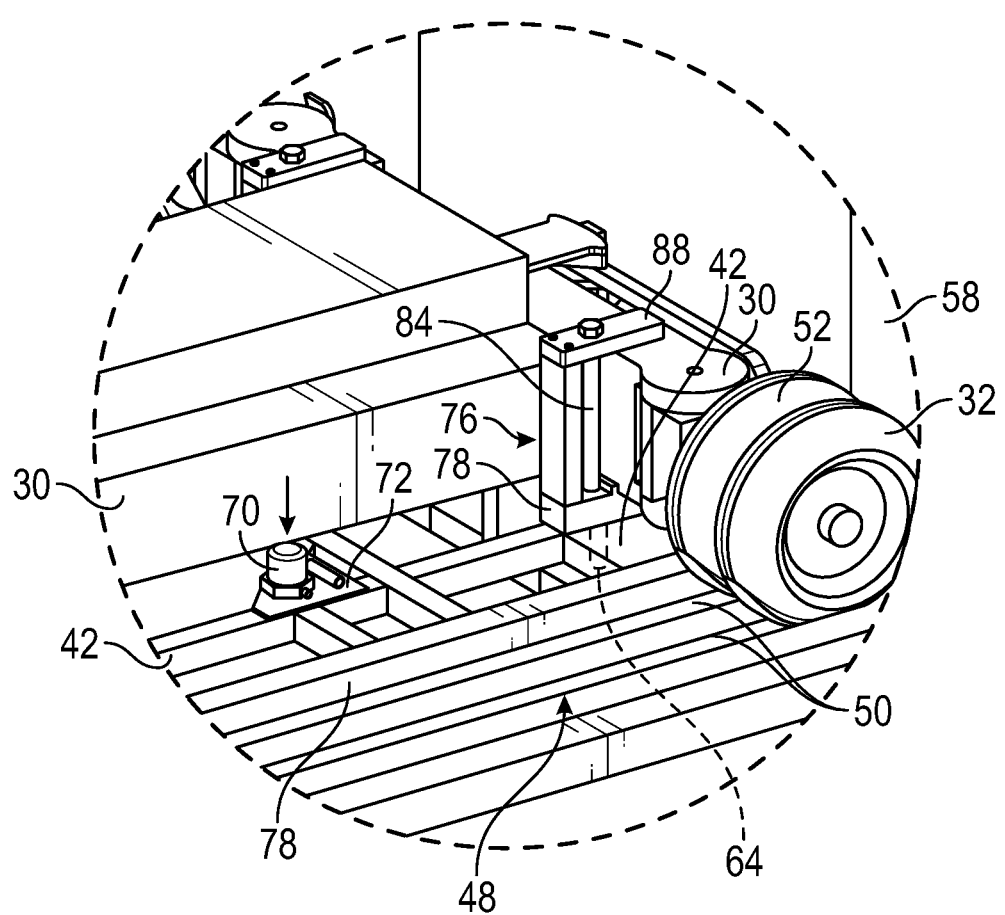
FIG. 5 is a perspective view of a clamp securing the mobile base of the camera crane onto the tractor.

As shown in FIG. 5, the load on the wheels 32 may be partially or fully removed and transferred directly onto the chassis 42 of the tractor 40 by jacking up each corner or each end of the mobile base 26 using a hydraulic or electric jack 70 positioned between a jack platform 72 or other structural element of the chassis 42 and the underside of the mobile base 26. The jack 70 is operated, for example, to lift one corner of the mobile base 26. The lower arm 78 of the clamp 76 is then placed between the chassis 42 and the mobile base 26. The arm stop 80 may be used to properly position the clamp 76. The jack 70 is then used to lower the mobile base which comes to rest on the lower arm 78, with little or no load remaining on the wheels 32. The lower arm 78 is underneath the frame 30 of the mobile base and the upper arm 88 is on top of the frame 30. The clamp bolt 84 is then threaded into a hole in the tractor chassis 42 and tightened, securely clamping the frame 30 of the mobile base onto the tractor chassis 42. The counter bores 90 allow the upper arm 88 to shift vertically so that tightening the clamp bolt 84 does not bend the upper arm 88.

The procedure described above may then be repeated at the other three corners of the mobile base 26. Alternatively, additional jacks 70 may be permanently provided on the tractor chassis 42 to avoid manually positioning a single jack sequentially at the corners of the frame 30 of the mobile base 26. In this case, the jacks 70 may optionally be powered hydraulically or electrically via the tractor motor 46 and controlled via valves or switches on a control panel of the tractor 40.

With clamps 76 installed at each corner of the frame 30 of the mobile base 26, all loads on the camera crane 24 are transferred directly to the tractor chassis 42 via the rigid connections provided by the clamps 76. The frame 30, chassis 42 and clamps 76 are typically metal, such as steel. As a result, stability of the camera platform at the front end of the crane arm 28 is improved. The camera crane 24 is also rigidly and securely held in place on the tractor 40 for movement over rough or soft ground and on steeply inclined surfaces. The camera crane 24 may be released from the tractor and returned onto the trailer 10 following the reverse of the steps described above.

Of course, other forms of clamps may be used. For example, the lower arm 78 may be omitted, with a spacer block placed between the jacked up frame 30 of the mobile base 26 and the chassis 42 of the tractor 40. In this modification, the spacer block need not be adjacent to the clamp bolt 84, which may be advantageous with certain tractors. The spacer blocks, if used, may have the same material, size and shape as the lower arm 78. The threaded holes 64 in the chassis 42 may be omitted with the clamp 76 simply clamping the frame 30 of the mobile base 30 to the chassis 42 of the tractor 40, similar to a conventional C-clamp. One or both ends of the frame 30 or the chassis 42 may be provided with ramps or wedges which lift weight off of the wheels, to reduce or eliminate jacking. Clamps may optionally be used at other positions on the frame 30 of the mobile base 26, away from, or in addition to, the corners.

Thus, a novel camera crane tractor has been shown and described. Various changes and modifications may of course be made without departing from the spirit and scope of the invention. The invention, therefore, should not be limited, except by the following claims and their equivalents.

The invention claimed is:

1. A camera crane tractor, comprising:
   a chassis;
   first and second spaced apart and parallel wheel decks on the chassis;
   first and second treads supported on tread rollers on the chassis;
   a motor for driving the first and second treads;
   at least one angled wheel guide strip on each of the wheel decks; and
   first and second front wheel stops pivotally or removably attached at front ends of the first and second wheel decks, respectively;
   a first rear wheel stop at a rear end of the first wheel deck; and
   a second rear wheel stop at a rear end of the second wheel deck.

2. The camera crane tractor of claim 1 further including first, second, third and fourth threaded holes in the chassis between the first and second wheel decks.

3. The camera crane tractor of claim 2 further including at least one jack on the chassis between the first and second wheel decks.

4. The camera crane tractor of claim 3 further including first, second, third and fourth jack platforms on the chassis, adjacent to the first, second, third and fourth threaded holes, respectively.

5. The camera crane tractor of claim 2 further including first, second, third and fourth clamps, with each clamp having an upper arm and a lower arm attached to a post, and a clamp bolt extending through the upper arm and through the lower arm, and with the clamp bolt of the first, second, third and fourth clamps threaded into the first, second, third and fourth threaded holes, respectively.

6. The camera crane tractor of claim 5 with the upper arm attached to the post via one or more bolts extending through counter bores in the upper arm to allow the upper arm to move vertically relative to the one or more bolts.

* * * * *